June 10, 1952 W. G. SPAIN ET AL 2,600,027
SAW SET
Filed Aug. 14, 1950 2 SHEETS—SHEET 2
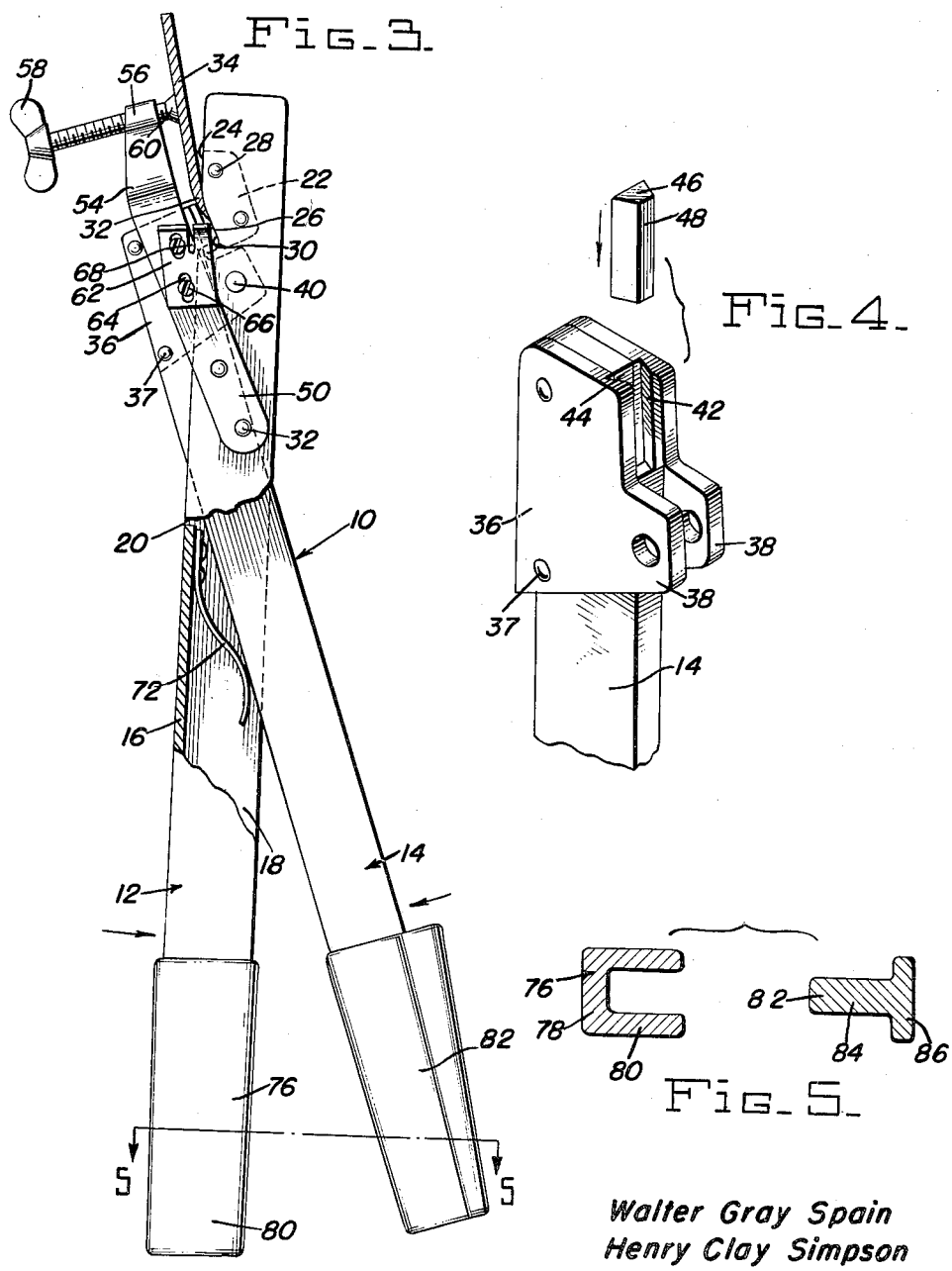
Walter Gray Spain
Henry Clay Simpson
INVENTORS
Clarence A. O'Brien
and Harvey B. Jacobson
Attorneys … Patented June 10, 1952

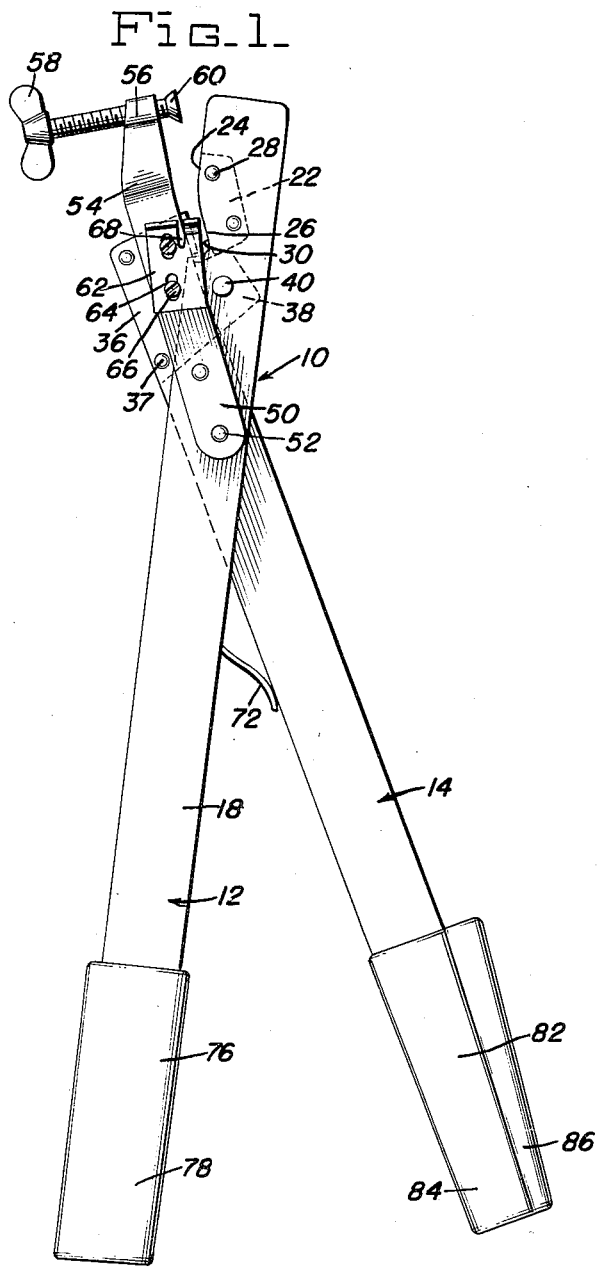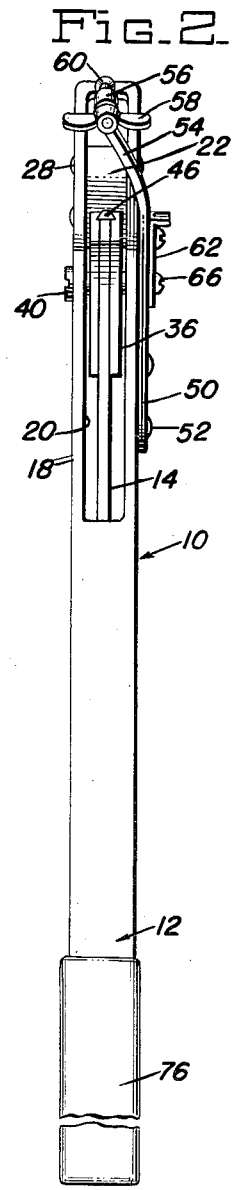
Walter Gray Spain
Henry Clay Simpson
INVENTORS

UNITED STATES PATENT OFFICE 2,600,027

SAW SET

Walter Gray Spain and Henry Clay Simpson, Danville, Va.

Application August 14, 1950, Serial No. 179,268

4 Claims. (Cl. 76—64)

This invention comprises novel and useful improvements in saw setting devices.

An important object of this invention is to provide a saw setting device in which the angle and depth of set may be readily varied in accordance with the size and shape of the saw teeth, in an improved manner.

Another object of this invention is to provide a saw setting device having a removable jaw member, whereby the latter may be replaced when worn, or interchanged with jaw members of different configurations in accordance with the size and shape of the teeth of the saw.

Yet another object of this invention is to provide a saw setting device which is of simple construction, and which is particularly adapted to be formed of sheet material, and which is highly efficient for the purposes intended.

An important feature of this invention resides in the provision of a first channel shaped arm having an aperture in the web portion thereof, and a second arm which is pivoted between the legs of the first arm and movable in said aperture, with a jaw member disposed between the legs of said first arm and retaining them in spaced relation to each other.

Another important feature of this invention resides in the provision of a saw setting device, in accordance with the foregoing feature in which the second arm has a pair of plates secured to opposite sides thereof, with a second jaw member detachably received between the plates, with ears on the plates pivotally attached to the leg portions of the first arm.

These together with various ancillary objects and features, are attained by this device, a preferred embodiment of which has been illustrated by way of example only in the accompanying drawing wherein:

Figure 1 is a side elevational view of the saw setting device;

Figure 2 is a rear elevational view of the setting device;

Figure 3 is a side elevational view of the saw setting device having a saw blade disposed between the jaws thereof, and with parts being broken away and shown in section to show details of construction;

Figure 4 is a fragmentary perspective view of one of the arms; and

Figure 5 is a transverse sectional view taken on the plane 5—5 of Figure 3.

Reference is now made more specifically to the accompanying drawings wherein like numerals designate similar parts throughout the various views. The saw setting device, indicated generally by the numeral 10, includes a first arm 12 and a second arm 14.

The first arm 12 is channel shaped in cross section and includes a web portion 16 and leg portions 18, the web portion being apertured as at 20, for reasons which will later become apparent as the following description proceeds. A first jaw member 22 having relatively diverging faces 24 and 26 is mounted between the leg portions 18 of the first arm 12 as by fasteners 28. As is thought apparent, the jaw member 22 serves to retain the leg portions 18 in spaced relation to each other, and the jaw member 22 may be removed from the arm 12, for replacement if worn, by merely removing fasteners 28.

It is intended that the face 26 of the first jaw member 22 be disposed at an angle to the longitudinal axis of the first arm 12, the leg portions 18 thereof being suitably recessed as at 30 to receive the teeth 32 of the saw 34 which are disposed against the face 26.

The second arm 14 has a pair of plates 36 secured to opposite sides thereof as by fasteners 37 adjacent one end, the plates having integral apertured ears 38 which receive the pivot pin 40 which is detachably received in the leg portions 18 of the first arm 12. The registering faces of the plates 36 are channeled as at 42 and the second arm 14 is recessed as at 44 to receive a complementarily formed second jaw member 46, which jaw member has a face 48 adapted to engage a tooth 32 of a saw 34. As is apparent from a consideration of Figure 4 of the drawings, the jaw member 46 is removably disposed between the plates 36 so that the jaw member 46 may be replaced, when worn, or interchanged with different sized jaws.

A guage arm 50 is attached to the leg portion 18 of the first arm 12 by fasteners 52, which guage arm has an offset portion 54 which terminates in an internally threaded sleeve 56. The sleeve 56, as is apparent from a consideration of Figure 2, is disposed in a plane which lies medially of the leg portions 18 of the first arm 12, which sleeve receives an adjusting screw 58 having a collar 60 thereon, which screw is movable towards and away from the plane of the jaw face 26 to adjust the angle of set of the teeth 32 of the saw 34.

An L-shaped bracket 62 having spaced slots 64 therein, is adjustably attached to the guage arm 50 by screws 66. The bracket 62 is slit as at 68 and a portion 70 thereof is offset towards the first jaw member 22 whereby the unattached leg of the bracket will underlie the tooth 32 of the saw adjacent the jaw members. Obviously by adjusting the position of the bracket 62 relative to the jaw members, the depth of set may be readily varied.

A resilient leaf spring 72 is attached at one end thereof by fasteners 74 to the web portion 16 of the first arm 12, the other end underlying the arm 14 to yieldingly urge the arms outwardly of each other.

The first arm 12 has a channel shaped handle member 76 of plastic or the like molded thereon, the handle including a web portion 78 and leg portions 80. The second arm 14 has a T-shaped handle 82, which includes a rib portion 84 and a flange portion 86, molded thereon.

In operation, the saw 34 is positioned between the jaw members 22 and 46, and the bracket 62 adjusted to limit the depth of set of the teeth 32. The screw 58 is then adjusted to engage the saw 34 and determine the angle of set of the teeth. Obviously, by merely urging the jaws 22 and 46 together, the jaw 22 will bend the end of the tooth 32 of the saw about the fulcrum defined by the relatively diverging faces 24 and 26 of the jaw member 22.

From the foregoing, it is thought that the operation and construction of the device will be readily understood, and further discussion is therefore believed to be unnecessary. However, since numerous modifications will readily occur to those skilled in the art, after a consideration of the foregoing specification and accompanying drawings, it is not intended to limit the invention to that shown and described, but all suitable modifications may be resorted to falling within the scope of the appended claims.

Having described the invention, what is claimed as new is:

1. A saw setting device comprising a first channel shaped arm having leg portions and a connecting web portion, said web portion having an aperture therein adjacent one end thereof and said leg portions having a pair of opposite recesses therein at opposite sides of said aperture, a second arm extending between said leg portions through said aperture in said first arm, means pivotally connecting said second arm to said leg portions, a first jaw member disposed between the leg portion of said first arm between said recesses, a second jaw member carried by said second arm and registering with said first jaw member and recesses to press a saw tooth into said recesses against said first jaw member, and a screw carried by said first arm and movable towards and away from the saw engaging face of said first jaw member, said recesses and first jaw member being disposed between said means and said screw.

2. The combination of claim 1 wherein said connecting means includes a pair of plates on opposite sides of said first arm having integral ears thereon and extending through said aperture in between said leg portions of said second arm, and a pin extending through said ears and said leg portions.

3. The combination of claim 1 wherein said connecting means includes a pair of plates having integral ears thereon secured to opposite sides of said second arm, and a pin extending through said ears and said leg portions, said plates having opposite spaced apart channels therein, said second jaw member being slidably and removably disposed between said plates and in said channels.

4. The combination according to claim 1 wherein said first arm is provided with a bracket thereon for gauging the depth of the set adjustably fixed on said arm at one side of said pair of recesses.

WALTER GRAY SPAIN.
HENRY CLAY SIMPSON.

REFERENCES CITED

The following references are of record in the file of this patent:

UNITED STATES PATENTS

| Number | Name | Date |
|---|---|---|
| 129,892 | Keller | July 30, 1872 |
| 660,535 | Taintor | Oct. 23, 1900 |
| 1,096,131 | Setterlund | May 12, 1914 |
| 1,131,105 | Ballard | Mar. 9, 1915 |
| 1,132,694 | Spencer | Mar. 23, 1915 |
| 1,524,577 | Rowlett | Jan. 27, 1925 |
| 2,401,264 | Murray | May 28, 1946 |